(12) United States Patent
Miller et al.

(10) Patent No.: US 9,709,988 B2
(45) Date of Patent: Jul. 18, 2017

(54) IDENTIFICATION OF ACCEPTABLE VEHICLE CHARGE STATIONS

(71) Applicant: Ford Global Technologies, LLC, Dearborn, MI (US)

(72) Inventors: Kenneth James Miller, Canton, MI (US); Jimmy Kapadia, Ottawa Hills, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/964,090

(22) Filed: Dec. 9, 2015

(65) Prior Publication Data

US 2017/0168493 A1    Jun. 15, 2017

(51) Int. Cl.
*B60L 11/00* (2006.01)
*G05D 1/02* (2006.01)
*B60L 11/18* (2006.01)
*G01C 21/36* (2006.01)

(52) U.S. Cl.
CPC ........ *G05D 1/0225* (2013.01); *B60L 11/1844* (2013.01); *B60L 11/1861* (2013.01); *G01C 21/3682* (2013.01); *G05D 2201/0213* (2013.01)

(58) Field of Classification Search
CPC .......................... B60L 11/1838; B60L 11/1861
USPC ........................................ 701/22; 180/65.265
See application file for complete search history.

(56) References Cited

U.S. PATENT DOCUMENTS

| | | |
|---|---|---|
| 7,986,126 B1 | 7/2011 | Bucci et al. |
| 2013/0211988 A1 | 8/2013 | Dorn et al. |
| 2013/0339108 A1 | 12/2013 | Ryder et al. |
| 2014/0025226 A1 | 1/2014 | Brown et al. |
| 2014/0122190 A1* | 5/2014 | Wolfson ............. G06Q 10/0631 705/13 |
| 2015/0032659 A1 | 1/2015 | Manfield et al. |
| 2016/0025506 A1* | 1/2016 | Penilla ................... G06Q 20/18 701/430 |

FOREIGN PATENT DOCUMENTS

| | | |
|---|---|---|
| NO | 2012058022 A2 | 5/2012 |
| WO | 2014074722 A1 | 5/2014 |

OTHER PUBLICATIONS

3reat Britain Search Report dated May 23, 2017 for Great Britain Application No. GB1620812.6, 10 pgs.

* cited by examiner

*Primary Examiner* — Gertrude Arthur Jeanglaude
(74) *Attorney, Agent, or Firm* — Frank A. MacKenzie; Brooks Kushman P.C.

(57) ABSTRACT

A vehicle may require an electric recharge. A request may be sent to obtain identification of charge locations along a route. Along with the request, data may be sent identifying vehicle location, route, and desired safety rating. A response may be obtained from a remote server, and the results may be displayed, which include the user rating of the charge station. The desired user rating may be adjusted based on the battery's state of charge (SOC). The desired user rating may be decreased as the battery state of charge decreases. The user may further set the desired user rating. The desired user rating may further depend on other ratings of the charging station.

20 Claims, 8 Drawing Sheets

IDENTIFICATION OF ACCEPTABLE VEHICLE CHARGE STATIONS

TECHNICAL FIELD

The present disclosure relates to identifying acceptable vehicle charge stations.

BACKGROUND

An electric vehicle requires recharging after use. A charging station may be located off a desired route, located in a dangerous area, missing available plugs, located far from an attraction, or provide the wrong type of electricity. Users of electric vehicles may be able to find charge stations that are nearby or on-route without knowledge of whether these locations are dangerous or undesirable or highly desirable. Information may be unavailable to the passenger or autonomous vehicle such that an informed decision cannot be made.

SUMMARY

A vehicle charging method and system includes identifying a charging location that a vehicle user may want to use to charge a vehicle. The vehicle includes a processor of other circuitry to identify a charge location along a route, e.g., based at least in part on third party ratings of the charging location/station. The vehicle, in response to a request to identify charge locations along a route, may load a third party user rating and display, in response to receipt of data from a remote server identifying charge stations, a charge location rating for identified charge stations accessible from the route exceeding a desired user rating based on the third party user rating and the received data from the remote server.

In an example, the third party user rating is an overall user rating that includes weighted rating inputs.

In an example, the user rating is a trusted third party rating designated at the processor.

In an example, the processor is further programmed to adjust the desired user rating based on battery state of charge.

In an example, the processor is further programmed to decrease the desired user rating as the battery state of charge decreases.

In an example, the processor is further programmed to send data off-vehicle identifying a desired activity rating and a desired safety rating, and in response to receipt of data from a remote server identifying charge stations each having a safety rating that exceeds the desired safety rating, a user rating that exceeds the desired user rating, and an activity rating that exceeds the desired activity rating, display indicators for the identified charge stations having the safety rating that exceeds the desired safety rating, the user rating exceeding the desired user rating, and the activity rating that exceeds the desired activity rating accessible from the route.

In an example, the processor is further programmed to send data off-vehicle identifying a desired utility rating, and in response to receipt of data from a remote server identifying charge stations each having a user rating that exceeds the desired user rating, and a utility rating that exceeds the desired utility rating, display indicators for the identified charge stations having the user rating that exceeds the desired user rating, and the utility rating that exceeds the desired utility rating accessible from the route.

In an example, the indicators identify at least one of a user rating and a utility rating for at least some of the identified charge stations.

An electric vehicle may comprise a processor programmed to, in response to a request to identify charge locations along a predefined route, send data off-vehicle identifying vehicle location and the route, and defining a desired user rating based on an identified third party rating and a desired safety rating, and in response to receipt of data from a remote server identifying charge stations each having a user rating that exceeds the desired user rating and a safety rating that exceeds the desired safety rating, display indicators for the identified charge stations accessible from the route.

In an example, the processor is further programmed to adjust the desired user rating based on battery state of charge.

In an example, the processor is further programmed to decrease the desired user rating as the battery state of charge decreases.

In an example, the processor is further programmed to send data off-vehicle identifying a desired safety rating and a desired user rating based at least in part on identification of a current user of the vehicle and the third party rating, and in response to receipt of data from a remote server identifying charge stations each having a safety rating that exceeds the desired safety rating and a user rating that exceeds the desired user rating, display indicators for the identified charge stations having a safety rating that exceeds the desired safety rating and a user rating that exceeds the desired user rating accessible from the route.

In an example, the processor is further programmed to send data off-vehicle identifying a desired utility rating from the third party and a desired activity rating from the third party, and in response to receipt of data from a remote server identifying charge stations each having an activity rating that exceeds the desired activity rating and a utility rating that exceeds the desired utility rating, display indicators for the identified charge stations having a utility rating that exceeds the desired utility rating and an activity rating that exceeds the desired activity rating accessible from the route.

In an example, the indicators identify a safety rating or a user rating for at least some of the identified charge stations.

In an example, the safety rating includes categorized crime data, a statistical crime value, or an aggregated user safety rating.

A method for controlling an autonomous vehicle may comprise sending data off-vehicle identifying vehicle location and route, and a vehicle user and receiving rating data from a remote server identifying charge stations accessible from the route and, for each of the charge stations, a weighted user rating including a trusted third party rating associated with the vehicle user. In an example, the method may include adjusting a desired user rating based on a battery state of charge and identity of the vehicle user. In an example, the method may include directing the vehicle to one of the charge stations having a user rating exceeding the desired user rating.

In an example, adjusting is such that the desired user rating decreases as the battery state of charge decreases.

In an example, one of the charge stations further has a user rating exceeding the desired user rating.

In an example, the vehicle is directed to a target charge station accessible from the route with a current state of charge having a user rating and a safety rating adjusted based on the battery state of charge.

In an example, the trusted third party rating is a charge station rating by a third party previously selected by the vehicle user.

In an example, receiving includes updating user ratings for a charge station location using stored third party ratings selected by the vehicle user and vehicle user ratings received after a charging event at the charge location.

DETAILED DESCRIPTION

Figure 1:
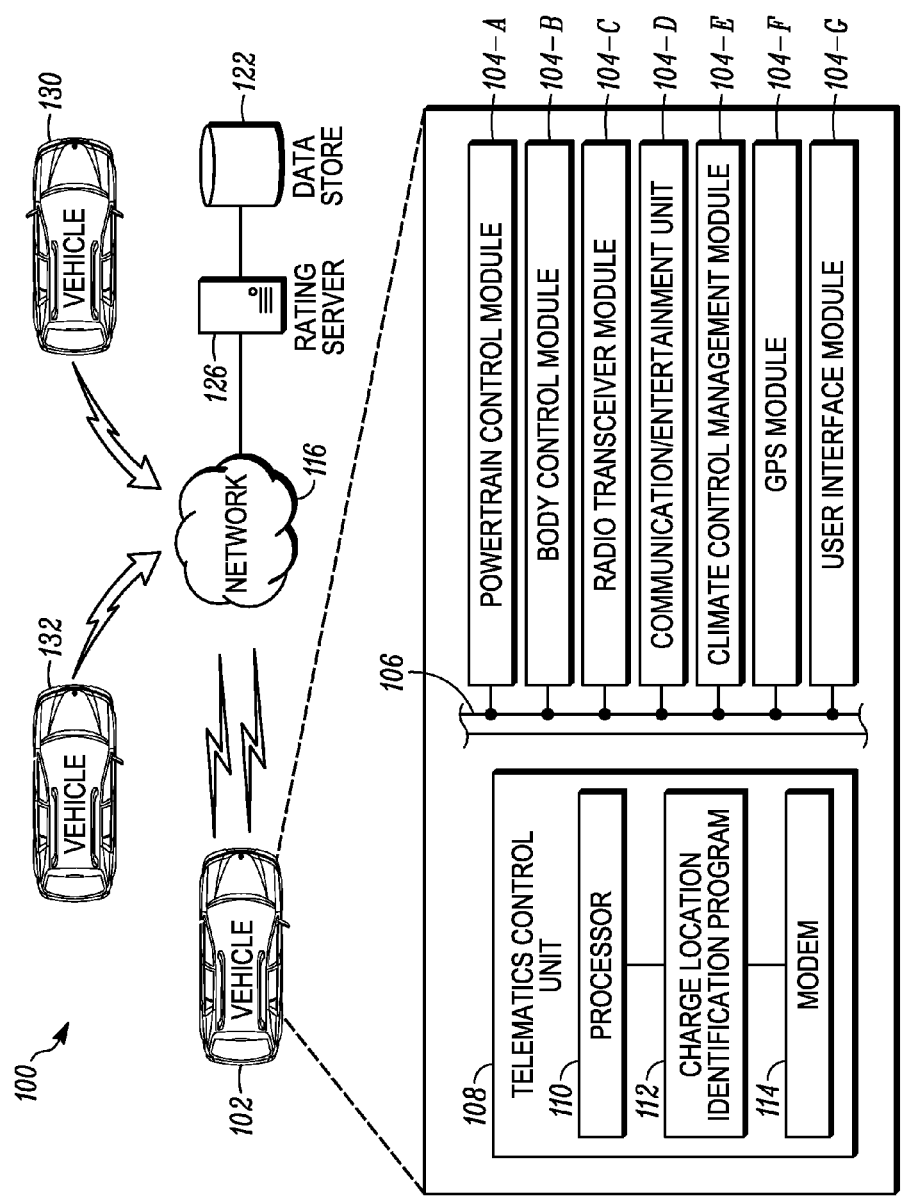
FIG. 1 is a schematic diagram of an operating environment for a mobile vehicle communication system usable in implementations of the described principles.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles can be powered by battery electricity (BEVs) for propulsion and other electrical loads. The battery may be recharged by a secondary power source (e.g. charging station, internal combustion engine, or solar panel). The battery may be arranged in an array with other batteries to provide additional voltage or longevity, and any type of battery may be used. Any type of battery including different combinations of electrolyte, anode material, cathode material, or combination thereof may power BEVs. In addition, capacitors may also be used to substitute or supplement battery arrays. Some common batteries in BEVs may include nickel-metal hydride, lead-acid, and lithium-ion. Vehicles may also be powered via a combination of battery electricity and internal combustion engine. Referred to as hybrid electric vehicles, these vehicles typically employ a combination of battery and engine propulsion. Hybrid electric vehicles may also use charging stations to recharge internal batteries.

Vehicles can either be autonomous or user-governed. An autonomous vehicle may automatically transport cargo or passengers to a desired location. A preprogrammed or programmed on-the-fly destination is entered, and the autonomous vehicle follows a generated route. Similarly, a user-governed vehicle may also obtain preprogrammed or on-the-fly destination routing. Either vehicle may require recharging of the battery while on the route. A global position system (GPS) may be used to determine the location of the vehicle. A plurality of proximate charging stations can be generated based on distance from the route and convenience.

A server may be configured to send and receive data from any number of clients. The server may be connected to a DataMart, data store, or data warehouse as a repository for server data. Any number of clients may enter information into the data store in order to provide accurate charging location data. The location data may be located on a server accessible via the internet or within the vehicle itself. The server may contain data related to location ratings. Location ratings may include an abundance of information that may indicate the desirability of the charge location. Information used to populate the location rating may include: 1. data obtained from the cloud, 2. data obtained from other users (third party data, which can be designated as trusted data by a vehicle user), 3. proximity data indicating the distance between the charge station and other attractions (e.g., malls, stores, restaurants, activity centers, etc.), 4. data including crime rates and statistics, 5. data indicative of previous users general feeling of safety, 6. indication of available charge plugs, 7. characteristics of the electrical supply, 8. collected user ratings about any given location (which can be designated as trusted data by a vehicle user), and 9. any other information that may be necessary to form a location rating.

A vehicle location system may include many processors and controllers. A controller or processor would generally include any number of processors, ASICs, ICs, Memory (e.g., Flash, ROM, RAM, EPROM, and/or EEPROM) and software code to co-act with one another to perform a series of operations. A microprocessor within a controller may further include a clock to provide timing and synchronization. A controller may communicate over a CAN bus or controller area network to other components or using other communications protocols. A controller or processor may also communicate over wireless networks to obtain data beyond the vehicle. A vehicle controller may send data off-board to the server and may receive data from the server. A vehicle controller may provide the server with the current state of charge or use the current state of charge to determine a target charge station. Sending data off-board could include data to a server located outside of the vehicle or to a server within the vehicle. The vehicle controllers and rating server may comprise a system for determining available charge stations along with the battery state of charge.

A vehicle controller may determine a battery state of charge using a battery charge controller or other system. The battery state of charge may depend on numerous factors (e.g., service time, usage, type of usage, etc.). The system may use many different factors in determining proximate charging stations. For instance, the charging station location system may identify the driver's route and location of next expected charge event (usually home, or work). The system may also estimate or learn the route from history (e.g., drive routes, time of day, and day of week). The system may identify "Daily Locations" by recognizing reoccurring GPS locations, and organize them by the location and time that charging or parking typically occurs.

This means, for example, that if a vehicle parks or charges at a specific location more than three times per week on average the system will use that space as a "Daily Location." Similarly, if a vehicle parks or charges at a specific location on a certain day more than once per month, the system will recognize that as a "Daily Location."

Further, the system can recognize "Historical Locations," which are retained when a vehicle has charged at the specified location one or more times in the past two months.

Data obtained from the cloud could include any information in which a passenger has an interest. This cloud data could include retrievable statistics from review sources providing the information. This information could include restaurant reviews or shopping attractions.

Users could also provide information. After or during use, a user could be instructed to rate the charge station on numerous characteristics, which are then sent by to the server. The users could provide information related to safety, activities, and utilities at each charge station. Some of the data may be real-time and other data may be historically tracked. Charge stations could also send information related to the safety, activities, and utilities available. In some instances a user merely provides a user rating, for example, a certain number of stars out of a maximum number (e.g., four out of five stars) or a numerical rating (e.g., a number out of ten). The user rating can be based on any impression of the charging station. The user rating may take into account intangible impressions of the charging location, appearance, helpfulness of others, "feel" of the location, overcrowded, abandoned, quality of the charging experience, and the like. The user ratings may be combined in to an overall rating. In some instances, a highly regarded user (e.g., a third party) may gain a reputation as providing the best user rating, e.g., most like what another user is looking for in a charging location, and other user's may follow that user's ratings and the vehicle will provide those charging locations that meet a minimum desired rating based on the highly regarded user's ratings.

A safety rating could include many different factors. A safety rating could include statistical information obtained from crime statistics authorities. A safety rating could also include categorical information related to types of crimes occurring nearby. A vehicle owner may be particularly interested in car theft statistics or armed robbery statistics. In addition, the safety rating could be determined by an aggregation of user reports and replies. Users may be queried on past events or general safety feelings when using the charge station. Users may, in addition, be queried on general feelings of the area the charge station is located in such as the widely held reputation of the borough or district. Recent crimes may be reported in a list to the passenger or vehicle, or recent crimes may be pinpointed on a map.

A utility rating could include many different factors. A utility rating could include the number of available plugs available. In addition, a utility rating could include the required voltage and adapter used to recharge the vehicle battery. The utility rating could also include the cost of electricity at each particular recharge station. A utility rating could include any practical or pragmatic factors that may be used to determine the usability of the charge station.

An activity rating could include many different factors related to attractions. An activity rating could include the proximity of malls, stores, restaurants, activity centers, movie theatres, museums, libraries, parks, and zoos. The activity rating could include any presumable activity that someone might do while recharging their car battery.

Desirable charge locations may be determined by the state of charge (SOC) remaining in the battery. A processor may determine a probable charge level remaining when arriving at each potential charge station by estimating the watt-hours required to travel the remaining distance to each charge station. The system may only display charge stations that do not require back-tracking. For example, when a driver leaves work, the driver does not want to back-track to the work location to charge.

In addition, if the probable charge level remaining when arriving at the charge station drops below minimum thresholds, a controller may take the increasingly intrusive actions such as reducing the desired user rating, the desired safety rating or portions of the desired user rating or the desired safety rating to indicate additional charge stations that may have not been previously included because the charge stations did not meet the originally desired user rating level or desired safety rating level.

An indicator screen may notify a passenger of different anticipated battery states. For instance, if a vehicle or server estimates that the charge level will be less than 20% after reaching a "Daily Location," the system may display, "Approximately 20% remaining on arrival." The indicator may be generated by a controller or other vehicle circuitry for display on the machine human interface.

If a vehicle or server estimates that charge level will be less than 10% after reaching a "Daily Location," then the vehicle may optimize efficiency of the powertrain by adjusting the operation of the vehicle's pedal demand, climate controls, accessory loads, HEV battery operation, regenerative breaking, or enter an ECO mode.

Further, if a vehicle or server estimates that charge level will be less than 2% after reaching a "Daily Location," then it may display suggested routes on-screen to pass by any "good" charge station. If a vehicle or server estimates that charge level will be less than 0% (0% being an indicated minimum threshold value and not necessarily representing actual battery voltage) after reaching a "Daily Location," then it may display suggested routes on-screen to pass by any "poor" charge station. "Good" and "Poor" stations may be identified based on their user rating by itself or in conjunction with at least one of user, safety, activity, or utility ratings. The vehicle may determine to override the vehicle user's indicated reliance on specific third party data when the charge level or SOC drops below a threshold. In an example, the trusted third party may not be weighted or may not be the threshold to be met when selecting a charging location/station.

If a vehicle or server estimates that charge level will be less than +5% (+5% being an actual value of less than an indicated minimum threshold and not negative voltage) after reaching a "Daily Location," or "Historical Location," then it may show or speak a warning that the customer should take a suggested route to avoid running out of charge. These steps may be performed by a self-governed or autonomous vehicle. An autonomous vehicle may adjust the desired safety rating automatically in order to avoid running out of charge. With this adjustment, an autonomous vehicle may automatically decrease the safety rating in line with the battery state of charge. This will ensure that the vehicle does not deplete the batteries entirely. It is possible that the vehicle would only be programmed to stop at charge stations on the way to the destination. The vehicle may also be programmed to allow passenger intervention in order to veto an intended charge station that does not meet the passengers' personal safety requirements.

Each of the aforementioned thresholds may be adjusted by the manufacturer or on-the-fly based on road conditions. For instance, a vehicle that was traveling in hazardous conditions may prefer the 5% threshold to activate when the battery is projected to reach 10% in the case that they are stranded due to weather (e.g., mountain climates with snowstorms). A vehicle in these situations may provide shelter and heat from the elements. Therefore, none of the aforementioned thresholds are intended to be permanent.

Referring to FIG. 1, a vehicle 102 may include a telematics control unit 108, a powertrain control module 104-A, a body control module 104-B, a radio transceiver module 104-C, a communications and entertainment unit 104-D, a climate control management module 104-E, a GPS module 104-F, and a user interface module 104-G. The vehicle 102 may be communicatively connected through a network 116 to a rating and charge station location server 126 that has a data store 122 for holding rating data. Additional vehicles 130, 132 may provide information to the rating and charge station location server 126 over the network 116. The network 116 may be a local controller area network, cellular network, or the internet. Data may be transmitted over any physical medium using wireless protocols (802.11, Bluetooth, GSM, or CDMA) or wired protocols. Data may be formed into packets and have guaranteed delivery (TCP). Data may be stored in the data store 122 using a SQL database or other similar relational database architecture. The vehicle user may use the interface module to select third party data to be followed or weighted more heavily in rating and selecting charging locations.

Figure 2:
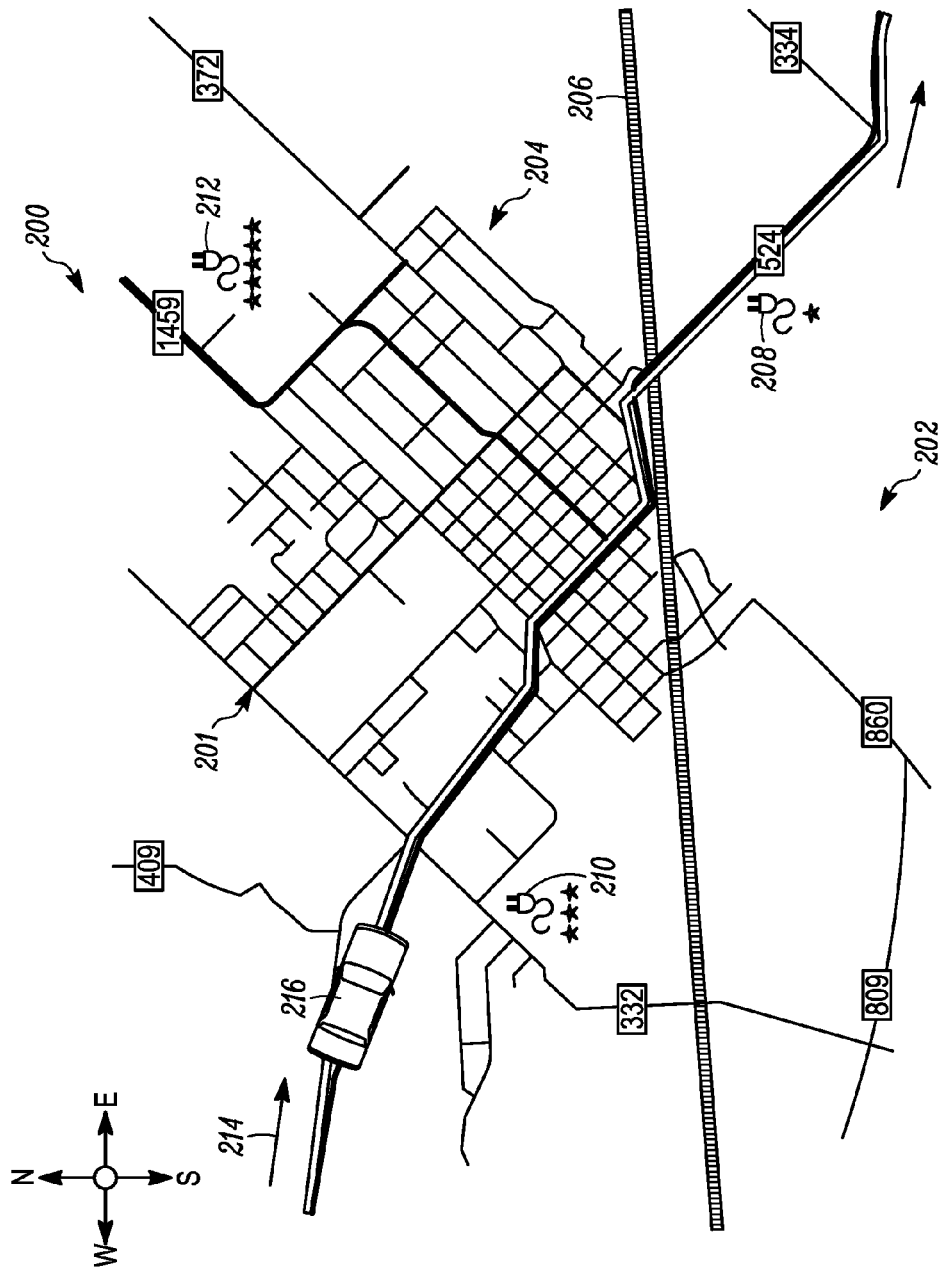
FIG. 2 is a schematic diagram of a display of a road map on a display screen of a vehicle.

Referring to FIG. 2, a map 200 of a city 201 is shown. The map includes an unsafe area 202 south of the railroad tracks 206. The map includes a safe area 204 north of the railroad tracks 206. A start point 214 shows a direction of travel for a vehicle 216. The vehicle 216 is on the way to a work location (not shown) to the east of the city 201. Having a desired user rating of five stars, a vehicle 216 may receive indication of the charge station 212. Having a desired user rating of five stars, the vehicle 216 would not receive indication of the lower starred charge stations 208, 210. If the vehicle 216 predicts a battery state of charge lower than desired at the assumed or disclosed destination, the desired user rating may be adjusted automatically to three stars and display the charge station 210 even though the charge station 208 is closer to the anticipated route. If the vehicle 216 predicts a battery state of charge lower than desired at the assumed or disclosed destination, the vehicle may adjust the desired user rating automatically to one star and display the charge station 208 even though the charge station 208 is at a location with a poor user rating. In some instances, the poor user ratings are on the unsafe side of the tracks. in an example, the desired user rating will be weighted to give more weight to a rating from a trusted third party rating. The trusted third party rating may be rating from a third party selected by a vehicle user.

Figure 3:
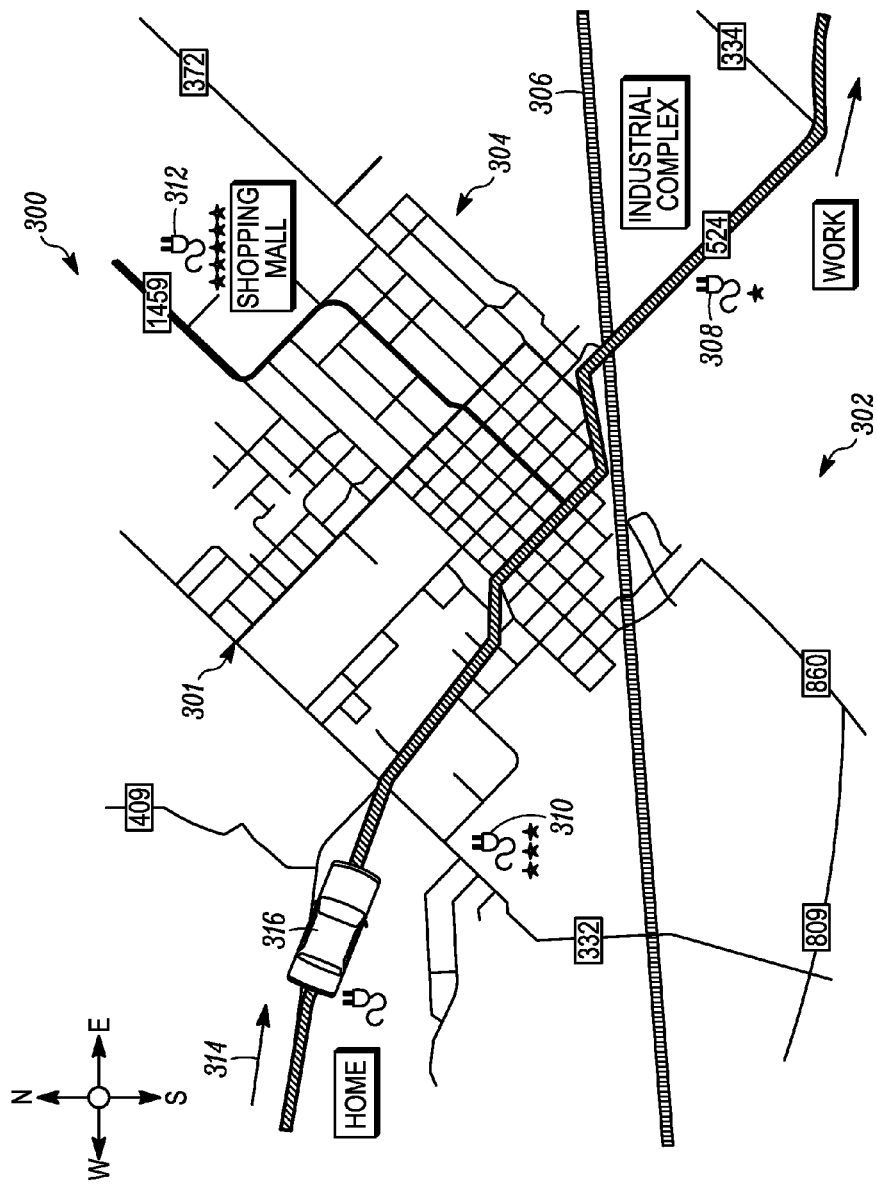
FIG. 3 is a schematic diagram of a display of a road map on a display screen of a vehicle including activities.

Referring to FIG. 3, a map 300 of a city 301 is shown. The map includes a poor user rated unsafe area 302 south of the railroad tracks 306. The map includes a high user rated area 304 north of the railroad tracks 306. A start point 314 shows a direction of travel for a vehicle 316. The vehicle 316 is on his way to work (not shown) to the east of the city 301. Having a desired user rating and the desired secondary rating activity rating is five stars or that an average of the desired user rating and the desired secondary rating is five stars, a vehicle 316 may receive indication of the charge station 312. The secondary rating may be a safety rating, an activity rating or a utility rating, or a derived rating that includes at least two of these ratings. The vehicle 316 would not receive indication of the lower starred charge stations 308, 310. If the vehicle 316 has a battery with a lower state of charge, the vehicle may adjust the desired user rating automatically to three stars and display the charge station 310 even though the charge station 310 is closer to an undesirable location, e.g., the other side of the tracks. If the vehicle 316 has a battery with a minimum state of charge, the vehicle may adjust the desired user rating automatically to one star and display the charge station 308 even though the charge station 308 is at a generally undesirable location or has a low secondary rating. Similarly, the activity rating could instead be a utility rating or other rating type.

Figure 4:
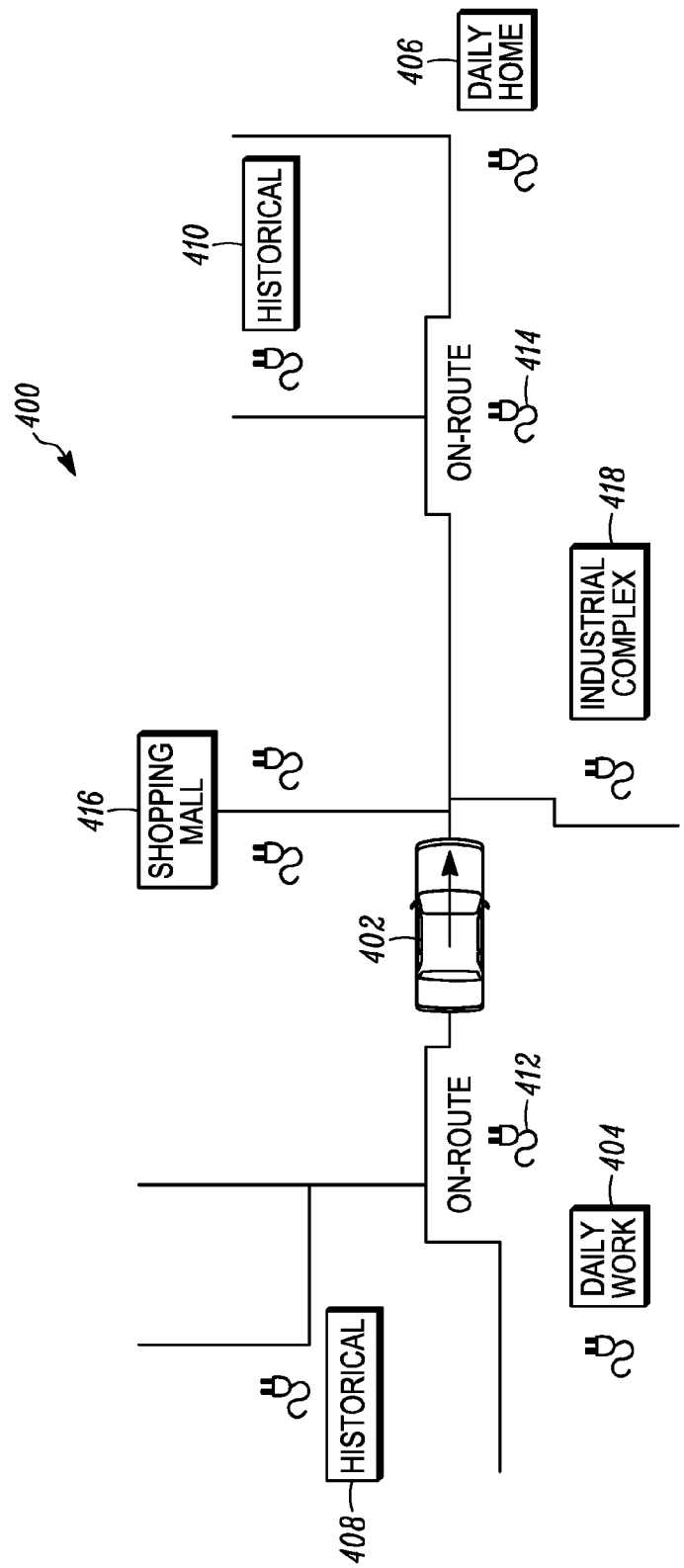
FIG. 4 is a map of a route with available "Daily Locations," "Historical Locations," "On-route Locations," "Unsafe Locations," and "Safe Locations."

Referring to FIG. 4, a map 400 of a route is shown. A vehicle 402 is depicted. A vehicle 402 has recently left a daily work location 404. If a projected battery state of charge after reaching a "Daily Location" such as the daily home 406 is less than 20%, then the projected battery state of charge will be displayed on a screen for the passenger. If a projected battery state of charge after reaching a "Daily Location" such as the daily home 406 is less than 15%, then the projected battery state of charge may be aurally announced to warn the passenger. If a projected battery state of charge after reaching a "Daily Location" such as the daily home 406 is less than 10%, then power conservation efforts will be executed to extend battery life. If a projected battery state of charge after reaching a "Daily Location" such as the daily home 406 is less than 5%, then the vehicle 402 can suggest using historical charge stations 408, 410 or on-route charge stations 412, 414. However, if the vehicle has already passed charge station 412, it may not be suggested. The system may also identify locations with projected battery state of charge on arrival. If a projected battery state of charge after reaching a "Daily Location" such as the daily home 406 is less than 2%, then locations that were not daily, historical, or on-route may be displayed as long as they meet the desired user rating, either with or without secondary ratings. Secondary ratings can be safety, activity, or utility rating. If a projected battery state of charge after reaching a "Daily Location" such as the daily home 406 is less than 0%, then locations (such as shopping mall 416 and industrial complex 418) that were not daily, historical, or on-route may be displayed even if they do not meet the desired user rating, or the desired secondary rating. If a projected battery state of charge after reaching a "Daily Location" such as the daily home 416 is less than −5%, then locations that were not daily, historical, or on-route may be displayed even if they do not meet the desired user rating, either with or without secondary ratings, and indications that the vehicle 402 should head directly to any charge station is displayed. All of these categorical decisions are applicable to either a self-governed vehicle or an autonomous vehicle.

Figure 5:
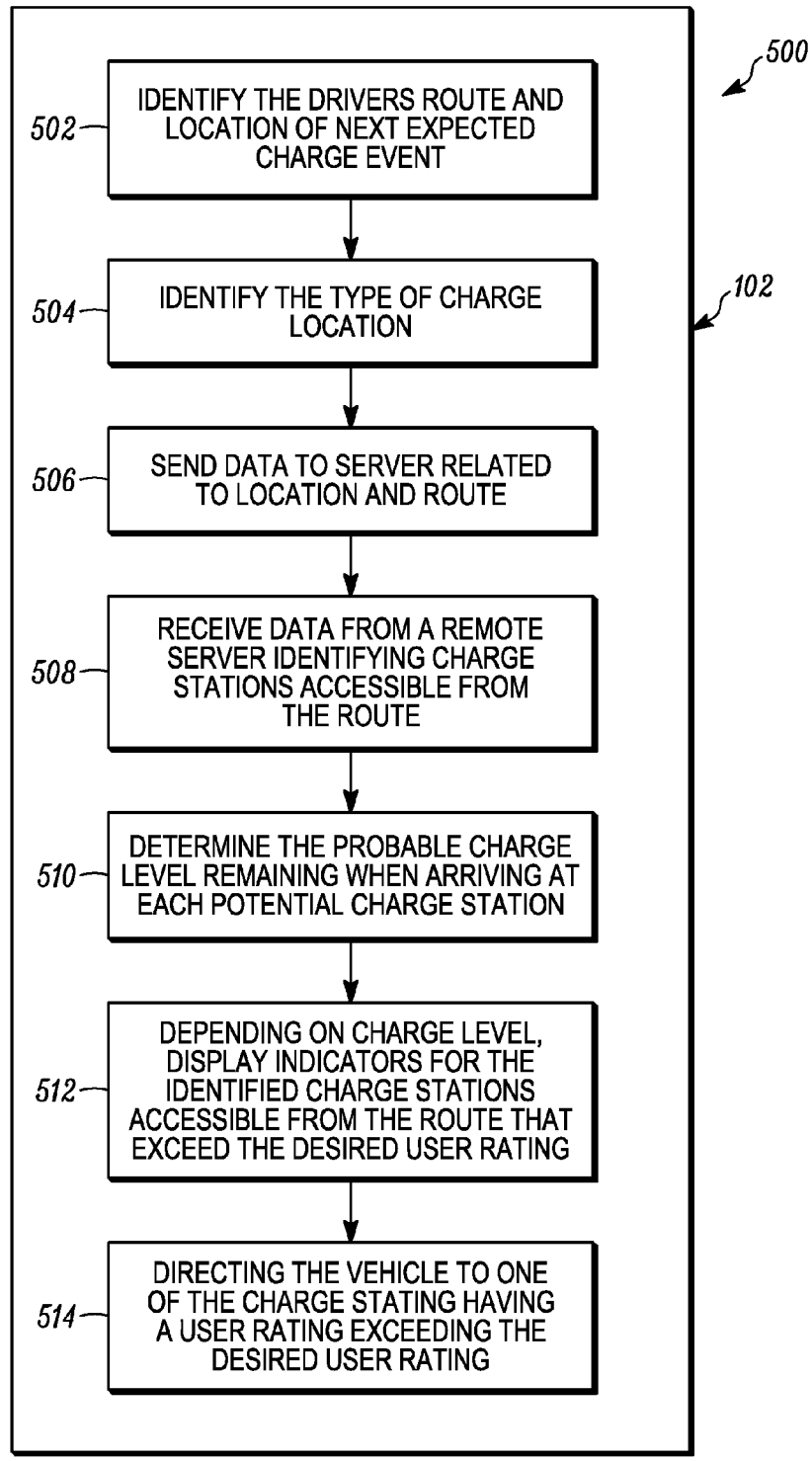
FIG. 5 is an algorithm for determining a desirable charge station based on a variety of factors.

Referring to FIG. 5, a flow diagram 500 is depicted. Starting in step 502, a route and location is identified related to the next charge location. In step 504, types of charge locations are identified. In step 506, the vehicle sends data to a server related to its current location and intended route. In step 508, the vehicle receives data from the server identifying charge stations accessible from the route. The vehicle or server may determine the probable charge level remaining when arriving at each potential charge station in step 510. In step 512, the vehicle may display indicators for the identified charge stations accessible from the route that exceed the desired rating, depending on a charge level. In step 514, the vehicle is directed to one of the charge stations having a rating exceeding the desired rating. In an example, the rating on which the charge station is ranked may be only the rating of at least one trusted third party, as selected and associated with a vehicle user. The identification of the trusted third party can be sent from the vehicle to the server. In an example, a code identifying the vehicle user is sent to the server, which filters the charge station user ratings based on the trusted user ratings as previously associated with the vehicle user. In another example, the server weights the ratings from a trusted user more heavily than other ratings to identify charge station that meet the desired user rating for a particular vehicle user.

Figure 6:
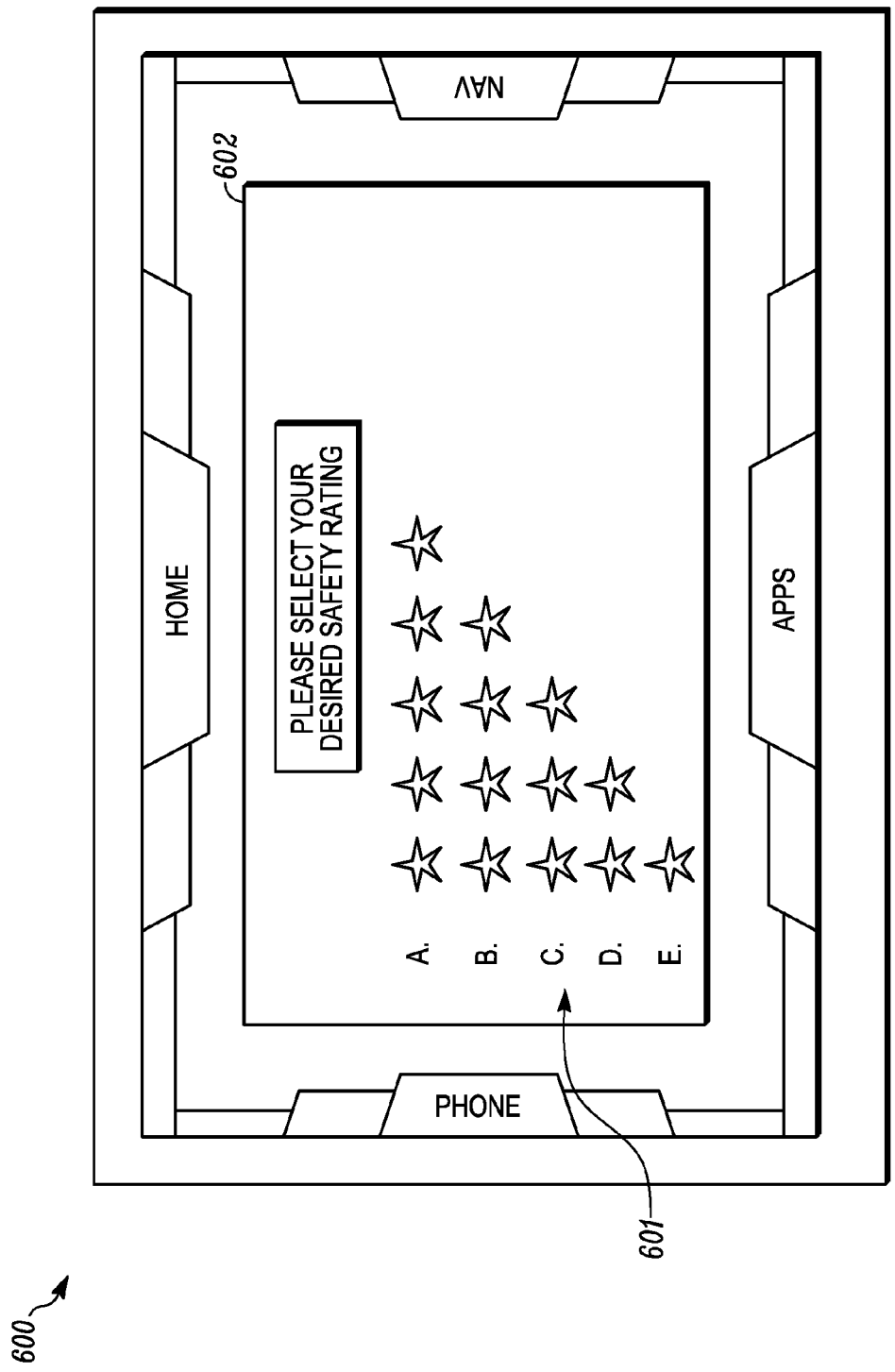
FIG. 6 is a selectable display in a vehicle capable of prompting a user for a desired safety rating.

Referring to FIG. 6, an example of an input screen 600 related to a desired safety rating is depicted. A vehicle user may enter the desired safety rating by selecting one of the options 601 on the vehicle display. A vehicle user could also transmit these options via a mobile device or computer. The desired safety rating could also be supplied by the manufacturer based on data gathering performed by the manufacturer or the cost of the vehicle. The vehicle user may also indicate the third party data that is trusted using the input screen.

Figure 7:
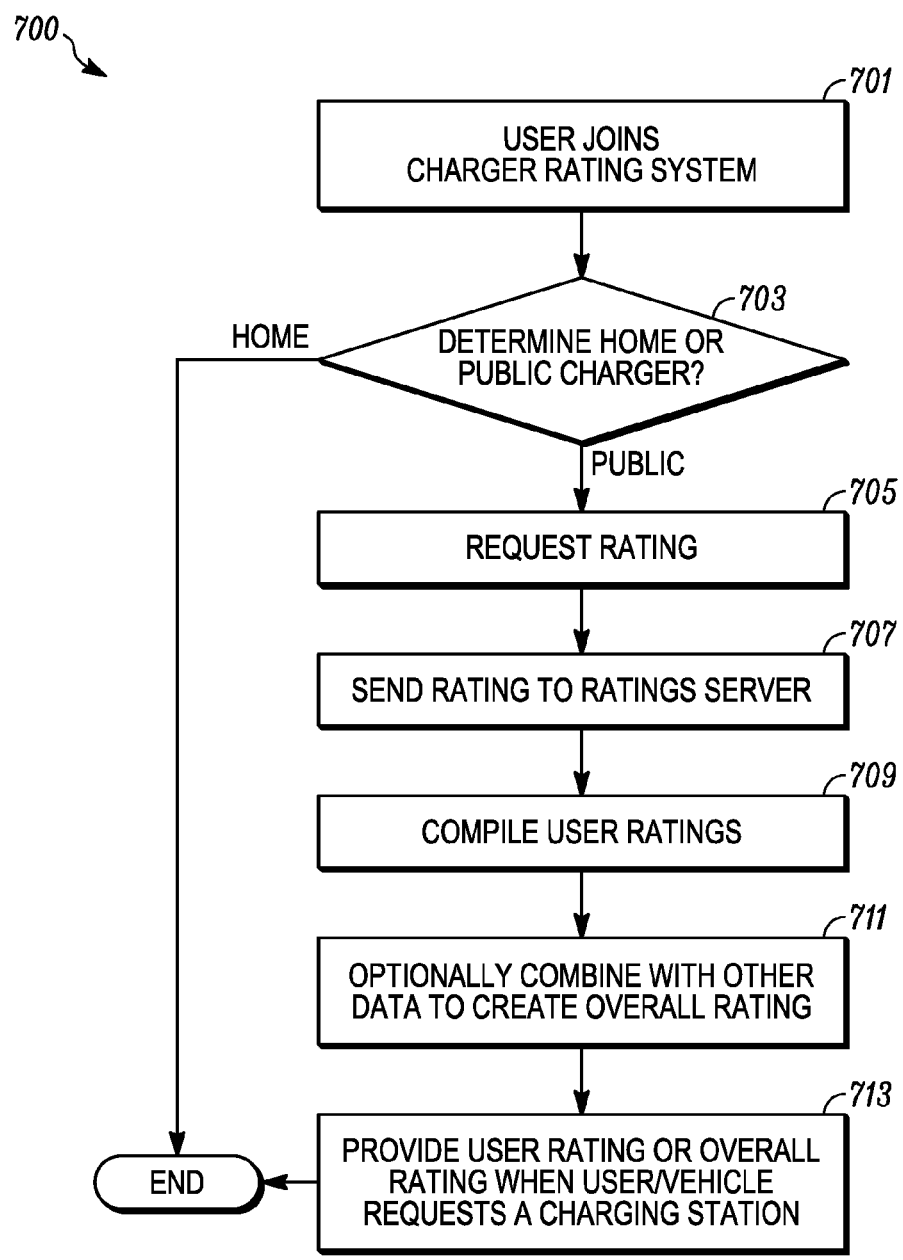
FIG. 7 is a schematic diagram of method for determining a user rating.

Referring to FIG. 7, an example method 700 relating to user ratings is depicted. At 701, a user is enrolled in a user ratings system that rates a vehicle charger. This can be done when a user purchases a vehicle in need of charging. A user who declines to join may be prompted to join when the user charges the vehicle at a location away from usual charging locations. The vehicle controller may prompt a user through the machine human interface, e.g., the input screen of FIG. 6. At 703, the vehicle controller determines if the charging location is a private or public charging station, e.g., when the charging process ends or is complete. A private charging station may be located at a private home, e.g., the residence of the user, a residence of a family member or friend of the user, and the like. A public charging station is a non-private charging station. The vehicle may use satellite navigation to locate the charging station. Examples of satellite navigation include Global Position System, GLONASS, Galileo, Bei-Dou and the like. If it is determined that the charging station is private, then the method ends for this charging station. At 705, if the charging station is a public station as determined by location, then the user is prompted to provide a rating of the charging station. The rating need not be detailed by merely and overall impression of the charging location. The vehicle may request the rating through the vehicle interface shown in FIG. 6. In an example, the user may be prompted to enter a rating through an interface at the charging location. In an example, the user may enter a rating through an application running on a mobile electronic device, e.g., a mobile phone, a smart phone, a tablet or the like. In an example, the vehicle may use its infotainment system to aurally ask the user for a rating and then using voice recognition through a microphone in the vehicle record the response. The vehicle then associates the user rating with the charging station. At 707, the user rating is transmitted to a ratings server, e.g., server 126 (FIG. 1) and through a network.

At 709, the user rating is compiled with user ratings from other users. Compiling user ratings may include performing statistical analysis on the user ratings, e.g., averaging, weighting, or discarding certain ratings. Compiling may also include weighting the user ratings. Weighting may include giving greater effect to certain user's ratings in the overall user rating or in the statistical analysis. Weighting can also go the other way; a certain user's rating may be given less effect in the overall user rating. For example, a verified user with numerous ratings may be given a greater weight in the analysis for their user rating. An unverified user may be given less weight. A user who consistently gives the lowest mark rating may be given little or no weight in compiling the overall user rating. The compiling of user ratings may also be done on a vehicle user basis so that the trusted ratings from a trusted third party are weighted more heavily in the review for a particular vehicle user.

At 711, the compiled user ratings may be combined with other data, other charging location ratings, or both to determine an overall rating for a charging location. At 713, the user ratings may be used to assist a vehicle in determining which charging location to show to a user when a vehicle is in need of a charge, e.g., as described above with regard to FIGS. 1-4. The rating provided may be a particular user's rating or an overall rating. The ratings may be sent through a communication network back to the vehicle. When the vehicle is need of a charge, it may request the overall user ratings for charging locations either on the predicted vehicle route or along an actual route determined by the vehicle navigation system. The user ratings can be displayed within the vehicle at a user interface (e.g., the display 600 shown in FIG. 6). The user may request additional information regarding a specific charging location by selecting that specific charging location. The additional information may include, but is not limited to, an activity rating, safety rating, utility rating, proximity data indicating the distance between the charge station and other attractions (e.g., malls, stores, restaurants, activity centers, etc.), data including crime rates and statistics, data indicative of previous users general feeling of safety, indication of available charge plugs, characteristics of the electrical supply, collected user ratings about any given location, and any other information that may be necessary to form a location rating.

Figure 8:
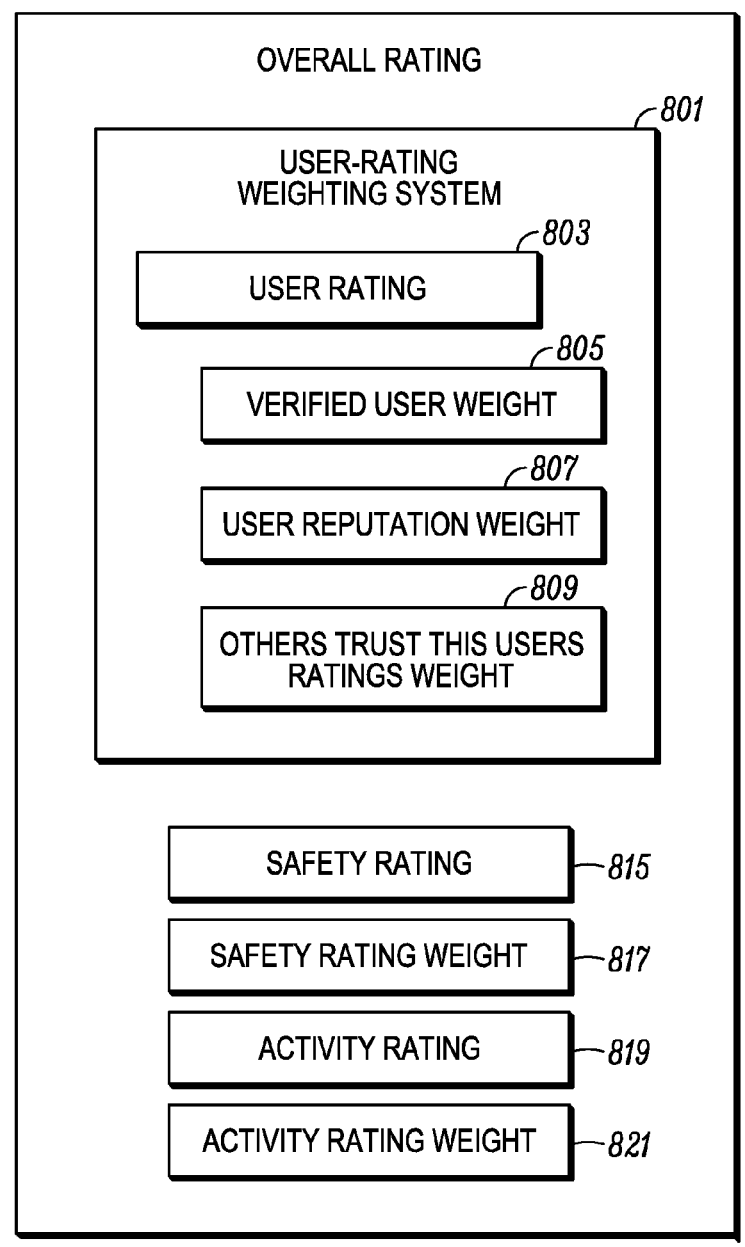
FIG. 8 shows a user rating system.

Referring to FIG. 8, an example an overall rating system 800 is shown. The rating system 800 may include a computing device, circuitry, or a server. The system 800 includes a user rating weighting system 801 that compiles a user rating using ratings from a plurality of users and may weight ratings from different users in different ways. Some users may influence the overall user rating more than other users. The user rating of a given charging location is received from a user. A user rating subsystem 803 stores the individual user ratings and overall user ratings. The user rating weighting system 801 includes a verified user weight 805, a user reputation weight 807 and an other users trust a specific user's ratings weight 809. The verified user weight 805 may be based on a user providing the charger location rating being verified with the rating system. Verification can be based on a code provided by the user or by the vehicle verifying the user based on identification by the vehicle, e.g., through a key fob programmed to the user. The user reputation weight 807 can be based on the user providing a certain number of reviews or the lack statistical variation from other users' ratings. The user rating system 800 may also allow users to trust or follow user ratings from a specific user. If enough other users follow a certain user's ratings, then that user may be a highly followed user whose ratings are given more weight when the system 800 weights users' ratings to arrive at an overall rating for charging locations.

The overall rating system 800 may also account for other ratings or data to arrive at an overall rating. A safety rating 815 may be taken into account. The safety rating may be weighted by a safety rating weight 817 when used to arrive at an overall rating. An activity rating 819 may be taken into account. The activity rating may be weighted by an activity rating weight 821. These weighted ratings may be used to calculate the overall rating in the system 800.

When a user of an electric vehicle needs to charge the vehicle, they can get a list of nearby charge stations, and they can possibly get a list of specifications on the charge stations. But a problem remains, there are intangibles that only previous users would be able to evaluate, such as are the chargers at the charge station often overcrowded, are some of the chargers malfunctioning, is the surrounding area dirty/oily, are the other users typically courteous enough to move the charger over to the next vehicle if a vehicle is waiting. An overall user rating may respond to real-time changes at a charging location by asking for a rating after each charging event. The present systems and methods provide for a user rating system that can take into account such intangibles and other criteria as described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a processor programmed to, in response to a request to identify route-accessible charge locations:
   load a third party user rating, and
   display, in response to receipt of data from a remote server identifying charge stations, a charge location rating for identified charge stations accessible from the route exceeding a desired safety rating and a desired user rating based on the third party user rating and the received data from the remote server.

2. The vehicle of claim 1, wherein the third party user rating is an overall user rating that includes weighted rating inputs.

3. The vehicle of claim 1, wherein the user rating is a trusted third party rating designated at the processor.

4. The vehicle of claim 1, wherein the processor is further programmed to adjust the desired user rating based on battery state of charge.

5. The vehicle of claim 4, wherein the processor is further programmed to decrease the desired user rating as the battery state of charge decreases.

6. The vehicle of claim 1, wherein the processor is further programmed to send data off-vehicle identifying a desired activity rating and the desired safety rating, and in response to receipt of data from a remote server identifying charge stations each having a safety rating that exceeds the desired safety rating, a user rating that exceeds the desired user rating, and an activity rating that exceeds the desired activity rating, display indicators for the identified charge stations having the safety rating that exceeds the desired safety rating, the user rating that exceeds the desired user rating, and the activity rating that exceeds the desired activity rating accessible from the route.

7. The vehicle of claim 1, wherein the processor is further programmed to send data off-vehicle identifying the desired utility rating, and in response to receipt of data from a remote server identifying charge stations each having a user rating that exceeds the desired user rating, and a utility rating that exceeds the desired utility rating, display indicators for the identified charge stations having the user rating that exceeds the desired user rating, and the utility rating that exceeds the desired utility rating accessible from the route.

8. The vehicle of claim 1, wherein the processor is further configured to display indicators for the identified charge stations identifying at least one of a user rating and a utility rating.

9. An electric vehicle comprising:
   a processor programmed to, in response to a request to identify charge locations along a predefined route, send data off-vehicle identifying vehicle location and the route, and defining a desired user rating based on an identified third party rating and a desired safety rating, and in response to receipt of data from a remote server identifying charge stations each having a user rating that exceeds the desired user rating and a safety rating that exceeds the desired safety rating, display indicators for the identified charge stations accessible from the route; and
   wherein the processor is further programmed to send data off-vehicle identifying a desired utility rating from the third party and a desired activity rating from the third party, and in response to receipt of data from a remote server identifying charge stations each having an activity rating that exceeds the desired activity rating and a utility rating that exceeds the desired utility rating, display indicators for the identified charge stations having a utility rating that exceeds the desired utility rating and an activity rating that exceeds the desired activity rating accessible from the route.

10. The vehicle of claim 9, wherein the processor is further programmed to adjust the desired user rating based on battery state of charge.

11. The vehicle of claim 10, wherein the processor is further programmed to decrease the desired user rating as the battery state of charge decreases.

12. A vehicle comprising,
   a processor programmed to, in response to a request to identify charge locations along a predefined route, send data off-vehicle identifying vehicle location and the route, and defining a desired user rating based on an identified third party rating and a desired safety rating, and in response to receipt of data from a remote server identifying charge stations each having a user rating that exceeds the desired user rating and a safety rating that exceeds the desired safety rating, display indicators for the identified charge stations accessible from the route; and
   wherein the processor is further programmed to send data off-vehicle identifying a desired safety rating and a desired user rating based at least in part on identification of a current user of the vehicle and the third party rating, and in response to receipt of data from a remote server identifying charge stations each having a safety rating that exceeds the desired safety rating and a user rating that exceeds the desired user rating, display indicators for the identified charge stations having a safety rating that exceeds the desired safety rating and a user rating that exceeds the desired user rating accessible from the route.

13. The vehicle of claim 12, wherein the indicators identify a safety rating or a user rating for at least some of the identified charge stations.

14. The vehicle of claim 13, wherein the safety rating includes categorized crime data, a statistical crime value, or an aggregated user safety rating.

15. A method for controlling an autonomous vehicle comprising:
   sending data off-vehicle identifying vehicle location and route, and a vehicle user, wherein the sent data includes a desired activity rating and a desired safety rating associated with the vehicle user;
   receiving rating data from a remote server identifying charge stations accessible from the route and, for each of the charge stations, a weighted user rating including a trusted third party rating associated with the vehicle user;

adjusting the desired user rating based on a battery state of charge and identity of the vehicle user; and directing the vehicle to one of the charge stations accessible from the route having a user rating exceeding the desired user rating, which was adjusted, a safety rating that exceeds the desired safety rating, and an activity rating that exceeds the desired activity rating.

16. The method of claim 15, wherein the adjusting is such that the desired user rating decreases as the battery state of charge decreases; and wherein the one of the charge stations further has a user rating exceeding the desired user rating.

17. The method of claim 15, wherein the vehicle is directed to a target charge station accessible from the route with a current state of charge having a user rating and a safety rating adjusted based on the battery state of charge.

18. The method of claim 15, wherein the trusted third party rating is a charge station rating by a third party previously selected by the vehicle user.

19. The method of claim 15, wherein receiving includes updating user ratings for a charge station location using stored third party ratings selected by the vehicle user and vehicle user ratings received after a charging event at the charge location.

20. A vehicle comprising:
a processor programmed to:
send data off-vehicle identifying desired activity and safety ratings;
in response to receipt of data from a remote server, identifying charge-stations having safety and activity ratings exceeding the desired safety and activity ratings, and a user rating that exceeds a desired user rating;
display route-accessible, identified charge-stations indicators having the safety, activity and user ratings that exceed the desired safety and activity ratings and the desired user rating.

\* \* \* \* \*